May 19, 1936.   J. O. JAMES   2,041,344
CONTINUOUS ELECTRICAL WALL SOCKET
Filed Nov. 9, 1931
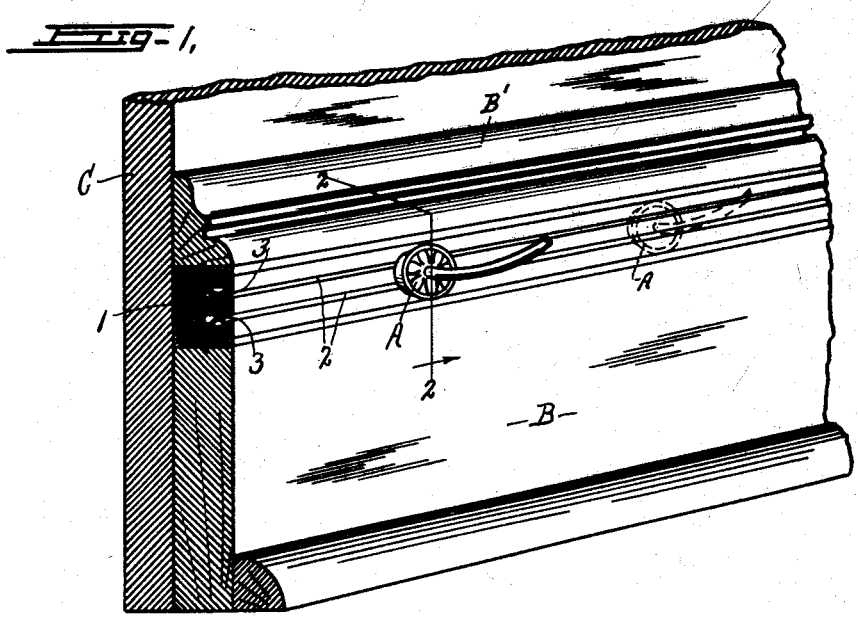
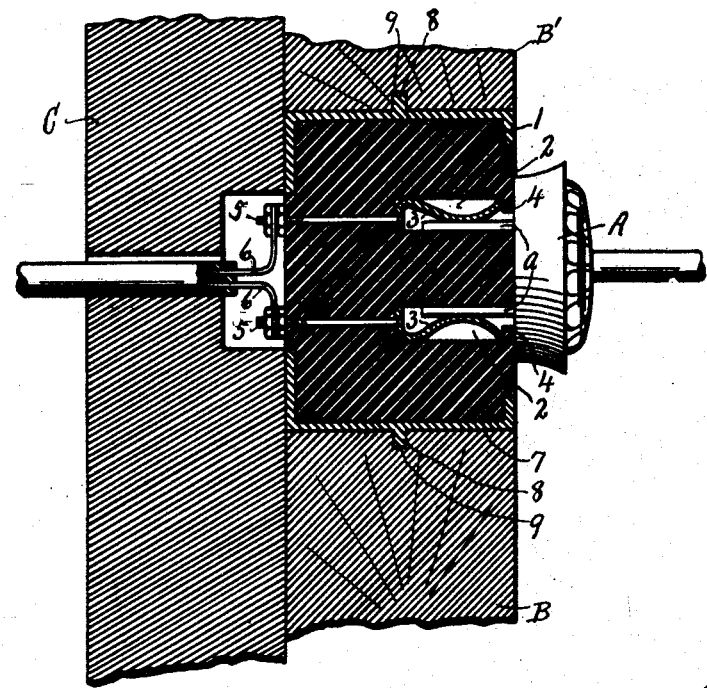
WITNESS
H. L. Meade.
INVENTOR
J. O. James
By
Denison & Thompson
ATTORNEYS Patented May 19, 1936

2,041,344

UNITED STATES PATENT OFFICE 2,041,344

CONTINUOUS ELECTRICAL WALL SOCKET

Jenkins O. James, Rome, N. Y.

Application November 9, 1931, Serial No. 573,729

1 Claim. (Cl. 247—3)

This invention relates to a continuous electric plug-in socket and to the method of installing the same in buildings or wherever such a device might be useful, but refers more particularly to the construction of the socket whereby the electric plug may be moved to different positions without displacing the same from the socket or disconnecting it from the plug terminals while at the same time permitting said socket to be removed from one position and reinserted in the socket in any other position within the length of said socket.

The main object, therefore, of the present invention is to provide an elongated socket of any desired length with continuous openings for receiving the terminals of an electric plug at any point throughout the length of the socket.

One of the specific objects is to incorporate a pair of continuous bus bar terminals of an electric circuit in a continuous support of insulating material and to provide said support with continuous slots or openings registering with the bus bars for receiving the terminals of the electric plug to contact with the bus bars at any point throughout the lengths thereof.

Another specific object is to provide means whereby the supporting strip for the socket terminals may be easily and quickly installed in operative position between the bottom and top sections of a base board or analogous structural element of the building.

Other objects and uses relating to specific parts of the continuous socket and to the method of installing the same will be brought out in the following description.

In the drawing:—

Figure 1 is a perspective view, partly in section, of a portion of a wall and base board of a building showing my improved continuous socket incorporated in the base boards.

Figure 2 is an enlarged sectional view taken in the plane of line 2—2, Figure 1 with the electric plug in operative engagement with the bus terminals of the sockets.

As illustrated, the electric socket comprises a continuous strip or body 1 of bakelite, vulcanized rubber, fibre or any other suitable insulating material provided with vertically spaced parallel lengthwise slots 2 opening through the outer face of said insulating body for receiving and retaining a pair of continuous terminals or bus bars 3 of L-shaped cross section, as shown in Figure 2, to form parts of an electric circuit.

The slots 2 are preferably of equal depth less than the depth of the insulating body 1 to form shoulders or abutments at the inner or rear sides thereof against which the inner ends of the terminal bus bars 3 are adapted to rest.

The outer or front portions of the insulating body 1 are provided with lengthwise ribs 4 extending part way across the open sides of the slots 2 to form abutments against which the outer ends of the bus bar terminals 3 are adapted to rest to prevent outward displacement of said bus bars and at the same time to leave the outer ends of the slots open a sufficient width to receive the terminals as $a$ of electric plug A.

As shown more clearly in Figure 2, the insulator body 1 extends between the slots 2 to form the inner side walls thereof and also to assist in guiding the terminals $a$ of the plug A into and out of the slots.

The inner edges of the socket terminals or bus bars 3 are offset toward each other and abut flatwise against the inner walls of the slots 2 and are provided with binding posts or screws 5 which extend through the rear portions of the insulating body 1 and are connected to wires 6 of the electric supply circuit as shown more clearly in Figure 2.

The terminal bars 3 are preferably made of spring copper or equivalent electric conducting metal and have their intermediate portions bowed toward each other and tensioned toward the opposite walls of their respective slots so that their convex faces normally lie in close relation to said opposite walls with their extreme outer ends deflected away from each other and engaged with the abutments 4 to facilitate the entrance of the plug terminals $a$ between the terminal bars 3 and thereby establish electrical connection between the socket terminals and plug terminals when the plug is placed in operative position.

The lower and upper edges of the insulating body 1 are preferably encased in channeled metal binding strips or sections 7 having their inner and outer edges flanged to engage in corresponding lengthwise grooves in the adjacent outer and inner faces of the insulating body 1 as shown in Figure 2 to hold said body against lateral displacement from the metal sections 7 and also to stiffen the insulating strip above and below the slots.

The intermediate portions of the sections 7 are provided with outwardly projecting ribs 8 which are engaged in corresponding grooves 9 in the adjacent edges of lower and upper base sections B and B' which may be secured to the main wall C in any conventional manner.

It is now clear that when installing the electric socket the base section B may first be secured in operative position to the wall C after which the socket including the insulating body 1, metal sections 7, terminal bars 3, and binding posts 5 may be placed in operative position upon the upper edge of the base section B with its tongue or rib 8 seated in the groove 9, it being understood that the wires 6 of the supply circuit have been previously connected to the binding posts 5.

The upper base section B' may then be secured in operative position in engagement with the corresponding tongue or rib 8 so that when both base sections are secured in proper position they will firmly hold the socket in fixed relation thereto.

When the electric socket is installed in the manner described, it is obvious that the electric plug A may be inserted into the slots 2 at any point throughout the length of the socket with the assurance that its terminals a will be brought into electric contact with the corresponding terminal bars 3 of the socket and that the plug may be moved along the slots to any position within the length of the socket without displacing it therefrom or disconnecting its terminals from those of the socket.

It is clearly obvious, however, that the plug may be removed from one position and inserted in any other position along the slots, if desired, but the fact that the plug may be moved along the socket with a sliding motion without breaking contact with the terminals of said socket is of considerable advantage, particularly when it is considered that the same socket may be used for the reception of an indefinite number of plugs for different electric translating devices now used in many homes with cord length limitations so that in case several of the translating devices might be in operation the plug for any one of those translating devices might be shifted along the socket without interrupting the operation of any of said translating devices.

Although I have described a fixture as a socket for receiving a multiplicity of electric plugs at any point throughout its length, it is intended to take the place of an indefinite number of separate sockets or wall fixtures as commonly used so that the user may plug in any electric translating device at any point throughout the length of the fixture.

It is, evident, however, that the fixture may be installed in any part of a wall or ceiling of a building or upon the underside of tables and other pieces of furniture to conform to any contour without departing from the spirit of the invention.

What I claim is:

In a continuous electrical wall socket, the combination with spaced wall-finishing sections, of an elongated substantially rectangular single-piece insulating member, a casing adapted to retain said member, and means comprising concealed projections on the casing extending into the spaced wall-finishing sections for retaining the casing therebetween, said insulating member having continuous terminal-receiving slots adapted to receive a plurality of electrical plugs slidable therein.

JENKINS O. JAMES.